United States Patent [19]
Arnold et al.

[11] Patent Number: 5,884,181
[45] Date of Patent: Mar. 16, 1999

[54] INTERFERENCE REDUCTION IN SHARED-FREQUENCY WIRELESS COMMUNICATION SYSTEMS

[75] Inventors: Hamilton W. Arnold, Neptune; Scott Yates Seidel, Aberdeen, both of N.J.

[73] Assignee: Bell Communications Research, Inc., Morristown, N.J.

[21] Appl. No.: 588,979

[22] Filed: Jan. 19, 1996

[51] Int. Cl.⁶ ................................................. H04B 7/26
[52] U.S. Cl. ............................... 455/450; 455/62; 455/63
[58] Field of Search ...................... 455/446, 447, 455/448, 449, 450, 452, 454, 455, 62, 63, 67.1, 12.1, 13.1, 427, 428

[56] References Cited

U.S. PATENT DOCUMENTS 5,276,908  1/1994  Koohgoli et al. ....................... 455/34.1
5,394,561  2/1995  Freeburg ................................. 455/13.1

OTHER PUBLICATIONS

E.N. Barnhart et al., "Frequency Reuse in the Cellular LMDS," Submission to the FCC for inclusion in the LMDS Rulemaking Record, Docket No. 92–297, Jan. 6, 1994.
Final Report of the LMDS/FSS 28 GHz Band Negotiated Rulemaking Committee (NRMC), Sep. 23, 1994.

*Primary Examiner*—Thanh Cong Le
*Attorney, Agent, or Firm*—Joseph Giordano; David A. Hey; Loria B. Yeadon

[57] ABSTRACT

An apparatus and method for reducing interference between an uplink transmitter of a space-based wireless communication system and an uplink or downlink receiver of a terrestrial wireless communication system are described. The space-based system may be a Fixed Satellite Service (FSS) system and the terrestrial system may be a Local Multipoint Distribution Service (LMDS) system. An ordered list of preferred uplink transmission frequencies is assigned to all FSS uplinks located in a particular cell of the LMDS system. Different ordered lists are used in different cells of the LMDS system, while uplinks located in the same cell can utilize the same ordered list. A given potentially-interfering uplink transmitter selects an uplink transmission frequency from the appropriate ordered list if the uplink is unable to operate outside the LMDS frequency band and there are no gaps in the LMDS spectrum which can accommodate the uplink transmission. The ordered list may be selected by the LMDS service provider such that the impact of interference from FSS uplinks can be readily predicted and minimized. The invention thus allows simultaneous access to a shared frequency band for both LMDS and FSS systems.

7 Claims, 4 Drawing Sheets

| 240 → | 1A | 2A | 3A | 4A | 5A | 6A | 7A | 8A |
|---|---|---|---|---|---|---|---|---|
| | 11B | 12B | 13B | 14B | 15B | 16B | 17B | 18B |
| 245 → | 9A | 10A | 11A | 12A | 13A | 14A | 15A | 16A |
| | 19B | 20B | 1B | 2B | 3B | 4B | 5B | 6B |
| | 17A | 18A | 19A | 20A | 1A | 2A | 3A | 4A |
| | 7B | 8B | 9B | 10B | 11B | 12B | 13B | 14B |
| | 5A | 6A | 7A | 8A | 9A | 10A | 11A | 12A |
| | 15B | 16B | 17B | 18B | 19B | 20B | 21B | 22B |

INTERFERENCE REDUCTION IN SHARED-FREQUENCY WIRELESS COMMUNICATION SYSTEMS

FIELD OF THE INVENTION

The present invention relates generally to interference reduction in wireless communication systems. More particularly, the present invention relates to techniques for reducing interference received in one wireless communication system from an uplink transmitter of another wireless communication system operating in the same frequency range.

BACKGROUND OF THE INVENTION

There has been much interest recently in providing broadband wireless access to fixed networks via cell-based terrestrial communication systems operating at millimeter wave frequencies. FIG. 1 illustrates the basic components of an exemplary communication system 100 referred to herein as a Local Multipoint Distribution Service (LMDS) system. The terrestrial point-to-multipoint LMDS system 100 provides wireless access to fixed networks. The LMDS system 100 includes a number of cells 105-i, i=1, 2 . . . M, each of which include a corresponding hub 110-i also referred to herein as a base station. The cells 105-i are nominally circular in shape. The hubs 110-i generally include hub transmitters which establish point-to-multipoint radio links with subscribers 115 located within a given LMDS cell 105-i. The hubs 110-i are each also connected to a fixed network 120, which may be a computer network, a cable television network or a public telephone network. Point-to-point interconnections or other transmission links could be used in place of fixed network 120 to interconnect cell hubs 110-i. LMDS systems in the U.S. are expected to operate at, for example, frequencies in the 27.5–28.35 and 29.1–29.25 GHz bands.

LMDS system 100 will typically reuse the same channel frequencies in adjacent system cells. This frequency reuse may be implemented using polarization reuse techniques in the hub transmitter in conjunction with either omnidirectional or directional hub antennas. Highly directional subscriber antennas may also be used to minimize interference from adjacent cells. When omnidirectional hub antennas are used, the system could be configured such that orthogonal linear polarizations V and H are transmitted in adjacent cells. When directional hub antennas are used, such as in an arrangement in which four 90° directional antennas each provide communication coverage over a 90° sector of a given cell, the system could be configured such that different orthogonal linear polarizations are utilized for adjacent antenna sectors.

Another technique which reduces interference levels between adjacent LMDS frequency reuse cells is frequency interleaving. Frequency interleaving is described in greater detail in E. N. Barnhart el al., "Frequency Reuse in the Cellular LMDS," Submission to the FCC for inclusion in the LMDS Rulemaking Record, Docket No. 92-297, Jan. 6, 1994, which is incorporated by reference herein. An exemplary frequency interleaving technique involves offsetting the carrier frequencies in different cells by about half of the adjacent channel spacing. For example, in transmission of FM video with channels spaced 20 MHz apart, a suitable frequency interleave offset is 10 MHz. If each FM video signal actually occupies only 18 MHz of its allocated 20 MHz band, the above-cited Barnhart et al. reference indicates that the amount of interference protection obtained from this exemplary frequency interleaving technique is on the order of 10 dB. This interleaving technique is best suited to modulation formats such as analog FM which concentrate signal energy near the center of the channel. These analog formats are likely to be utilized in LMDS systems designed for broadcast video distribution, although digital modulation formats may also be utilized in broadcast video distribution, data distribution as well as other services.

Link budgets for LMDS systems generally assume an unblocked path between the hub 110-i and the subscribers 115. In many locations, this may not always be the case due to blockage from buildings, trees or other obstructions. Low power active repeaters can be used to fill in areas of the cell where there is insufficient signal strength due to excessive blockage along the direct path in the direction of the nearest hub transmitter. A typical repeater would be located inside the boundaries of a cell at a location where the signal can be received from the base station, and would amplify and redirect the signal. The repeater antenna could be cross-polarized to the nearest LMDS hub antenna in order to reduce interference to subscribers not utilizing the repeater.

The LMDS system 100 may be used to provide wireless access to services ranging from one-way video distribution and telephony to fully-interactive switched broadband multimedia applications. Circuit switched applications such as voice telephony, personal video telephony, backhaul for personal communications services (PCS) and ISDN multimedia services could be accommodated. Packet-oriented services such as remote database query, interactive entertainment, personalized information services on virtual channels, transaction processing and electronic data interchange could also be implemented. Additional LMDS applications include primary or emergency backup data transport, two-way distance education and corporate training, and high capacity switched data for image transfers and remote consultation for medical users. Interactive uses include video on demand, home shopping, interactive video games, and residential and business data from sub-T1 to multiple T1 rates. Implementation of digital modulation formats allows the LMDS system provider to take advantage of improvements in digital compression technology and expand to HDTV as these technologies become available.

Presently proposed LMDS system architectures generally differ in terms of cell size, modulation format and hub antenna type. Other system design parameters include antenna patterns, antenna heights, antenna pointing, cell spacing, frequency reuse plan, polarization reuse plan and link budget. The particular configuration of parameters selected for a given LMDS system will generally depend upon which of the previously-mentioned communication applications the system is intended to support, and the underlying architecture philosophy of the equipment and service providers. An exemplary consumer-oriented LMDS system proposed by CellularVision (CV) provides analog FM video distribution with a 4.8 km cell radius, and utilizes polarization reuse, directional subscriber antennas and frequency interleaving to reduce interference between cells. The CV system also utilizes return links (subscriber-to-hub) operating at a lower data rate in the guard bands of the downlink broadcast video channels. A two-way multiple access LMDS system described by Texas Instruments (TI) to the FCC Negotiated Rulemaking Committee (NRMC) on the LMDS/FSS 28 GHz band, July-September 1994, utilizes 52 Mbps QPSK and four directional sector antennas at each hub to provide omnidirectional cell coverage with a nominal cell radius of 5 km. Dedicated spectrum is used for return links, and in asymmetrical traffic applications, users are multiplexed in accordance with a time-domain multiple access (TDMA) technique. Both the CV and TI LMDS systems are designed for operation in the above-noted 27.5–28.35 and 29.1–29.25 GHz LMDS frequency bands. The CV and TI systems are described in greater detail in the Final Report of the LMDS/FSS 28 GHz Band NRMC, Sep. 23, 1994, which is incorporated by reference herein. The 28 GHz band as used herein refers generally to frequency bands which include or are situated in proximity to 28 GHz. The 28 GHz band is thus intended to include frequencies or frequency bands between about 27.5 and 30.0 GHz, such as the above-noted exemplary LMDS bands of 27.5–28.35 and 29.1–29.25 GHz. It should be noted that LMDS systems may also be configured to operate in a variety of other frequency bands.

A significant problem which has arisen in connection with the above-described LMDS systems is the fact that a number of space-based and terrestrial communication systems were proposed for operation within the same portions of the 28 GHz frequency band. For example, portions of this band have been requested by mobile satellite service (MSS) providers for feeder links to satellites providing mobile service, and by fixed satellite service (FSS) providers for fixed-location subscriber uplink transmitters. Microwave equipment manufacturers have also requested allocation of portions of the band for point-to-point microwave service. The above-noted LMDS/FSS 28 GHz band NRMC was formed to study these and other interference issues and to make recommendations to the FCC for allocating and/or sharing the 28 GHz band between LMDS and satellite services. The NRMC investigated a number of interference scenarios covering interference from FSS earth station and MSS feeder link uplinks into LMDS subscriber receivers and interference from LMDS hub transmissions into FSS and MSS satellite receivers. Satellites in both geosynchronous orbit (GSO) and non-geosynchronous orbit (NGSO) were considered. The scenario which showed the greatest potential for harmful intersystem interference was FSS earth stations interfering with LMDS subscriber receivers. LMDS and FSS system proponents envision widespread distribution of LMDS subscribers and FSS earth stations, respectively, throughout the same geographic areas. The description of proposed FSS systems submitted to the LMDS/FSS 28 GHz band NRMC indicates that a single FSS uplink transmitter can cause harmful interference to multiple LMDS receivers.

FIG. 2 illustrates potential interference between an FSS earth station uplink transmitter 140 and LMDS subscriber, hub and repeater receivers in a given cell. The FSS transmitter 140 transmits an uplink signal to an FSS receiver 150 which in this example is a GSO satellite receiver. The LMDS hub 110-1 transmits and receives signals from the LMDS subscriber 115 and as noted above may utilize an LMDS repeater 160 to communicate with other subscribers in a corresponding repeater sub-cell. The desired FSS uplink and LMDS signal paths are shown as solid lines. The dashed lines indicate undesirable interfering signals. It can be seen from FIG. 2 that the FSS transmitter uplink signal represents an interfering signal to the LMDS subscriber 115, the LMDS hub 110-1 and the LMDS repeater 160. The interference power generated is directly proportional to the FSS earth station antenna sidelobe level in the direction of the LMDS subscriber 115. A single FSS transmitter can thus simultaneously interfere with many different LMDS subscriber receivers, as well as LMDS hub and repeater receivers. The problem is magnified when the FSS uplink experiences rain attenuation since proposed system designs implement power control to adaptively increase the transmitted power under heavy rain conditions. Similar interference problems arise between other types of terrestrial and space-based systems.

Prior art techniques for resolving these and other interference problems include full allocation of a given frequency band to either FSS or LMDS systems, or band segmentation in which both FSS and LMDS systems would receive less bandwidth than desired. For example, a band segmentation approach has been proposed for resolving the potential interference between FSS uplinks and LMDS subscriber receivers in the above-noted 28 GHz frequency band. However, these known techniques unduly restrict the use of a given frequency band and thereby prevent optimal delivery of the above-noted communication services to subscribers.

As is apparent from the above, a need exists for improved interference reduction which allows simultaneous operation of shared-frequency terrestrial and space-based communication systems.

SUMMARY OF THE INVENTION

The present invention provides a method and apparatus for reducing interference between an uplink transmitter of a first communication system and a receiver of a second communication system. The first system may be a space-based system such as the Fixed Satellite Service (FSS) system and the second system may be a terrestrial system such as a Local Multipoint Distribution Service (LMDS) system. The first and second systems are configured to share at least a portion of a given frequency band, such as a portion of the above-described 28 GHz millimeter wave frequency band. Each uplink transmitter of the first system located within a particular cell of the second system is assigned a predetermined ordered list of preferred transmission frequencies. Different frequency lists are generally assigned to uplinks of the first system located in different cells of the second system, while uplinks located within same cell may be assigned the same frequency list. A given potentially-interfering uplink transmitter selects an uplink transmission frequency from the appropriate ordered frequency list if (1) the uplink is unable to operate outside the frequency band shared with the second system where it may cause interference and (2) there are no available gaps in the second system spectrum which can accommodate the uplink transmission without causing interference. The ordered list may be selected by an LMDS service provider such that the impact of interference from FSS uplinks is considerably reduced. The invention thus allows simultaneous access to an entire shared frequency band for both LMDS and FSS systems. For example, an FSS provider implementing the invention is not prevented from using any particular uplink frequency in the shared frequency band, while the potential interference to an LMDS provider operating in the same band is directed first towards a single predetermined channel. The invention may be similarly utilized to reduce interference between many other types of terrestrial or space-based communication systems.

In accordance with one aspect of the invention, a method is provided which includes the step of assigning at least one preferred uplink transmission frequency to each of a plurality of uplinks of the first communication system which are located in cells of the second communication system. The preferred uplink transmission frequencies are assigned such that a given uplink located in one of the cells of the second system is assigned a different preferred frequency than an uplink located in another cell of the second system.

In accordance with another aspect of the invention, an apparatus is provided which includes a processor coupled to an uplink transmitter in the first communication system and operative to select an uplink transmission frequency for the transmitter. The uplink frequency is selected from an ordered frequency list which includes a number of preferred transmission frequencies assigned to the transmitter. The preferred frequencies for a given transmitter are assigned based on the particular cell of the second communication system in which the transmitter is located. The apparatus further includes a memory coupled to the processor and operative to store the preferred uplink transmission frequencies.

The present invention provides a spectrum-sharing protocol which accommodates simultaneous use of a shared frequency band by space-based and terrestrial communication systems. In a preferred embodiment, neither system is denied access to any portion of the shared frequency band. The interference is reduced by the process of an FSS provider first directing uplink transmissions to gaps in the terrestrial downlink spectrum and then selecting uplink transmission frequencies in accordance with predetermined preferences which differ from cell to cell in the terrestrial system. This allows the potential interfering signals to be spread out in actual IF transmission frequency, but also to be directed towards the same channel or channels (information content) of a given cell of the second system. The spectrum protocol of the present invention does not place an onerous burden on either FSS or LMDS system providers. For example, the protocol may be implemented with simple modifications to existing channel access and dynamic reassignment procedures for FSS uplinks. The protocol preserves the possibility of global allocation of portions of the 28 GHz band for FSS uplinks while allowing substantially complete deployment of LMDS systems in the same geographic regions. Benefits are thereby provided to both FSS and LMDS system providers by achieving co-frequency sharing of the 28 GHz frequency band. Similar advantages are provided in other shared-frequency communication systems.

These and other features and advantages of the present invention will become more apparent from the accompanying drawings and the following detailed description.

DETAILED DESCRIPTION OF THE PREFERRED EMBODIMENT

The present invention will be illustrated herein in conjunction with an exemplary local multipoint distribution service (LMDS) terrestrial communication system and a fixed satellite service (FSS) space-based system. It should be understood, however, that the invention is more broadly applicable to any terrestrial or space-based system which includes an uplink transmitter capable of interfering with a receiver. The invention may thus be utilized to reduce interference between two or more terrestrial communication systems as well as between two or more space-based systems. Furthermore, although illustrated using millimeter wave frequency bands in the range between about 27.5–30.0 GHz, the invention may be utilized in systems operating in any of a number of alternative frequency bands.

Figure 1:
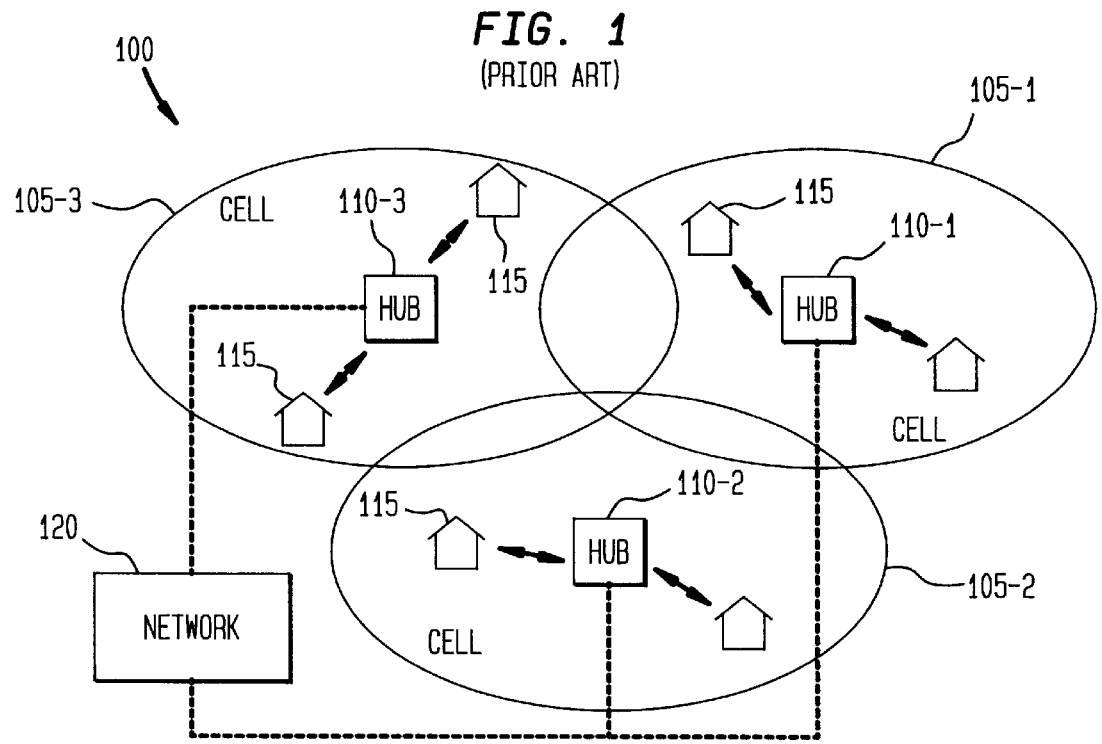
FIG. 1 illustrates the basic components of an exemplary Local Multipoint Distribution Service (LMDS) system.
Figure 2:
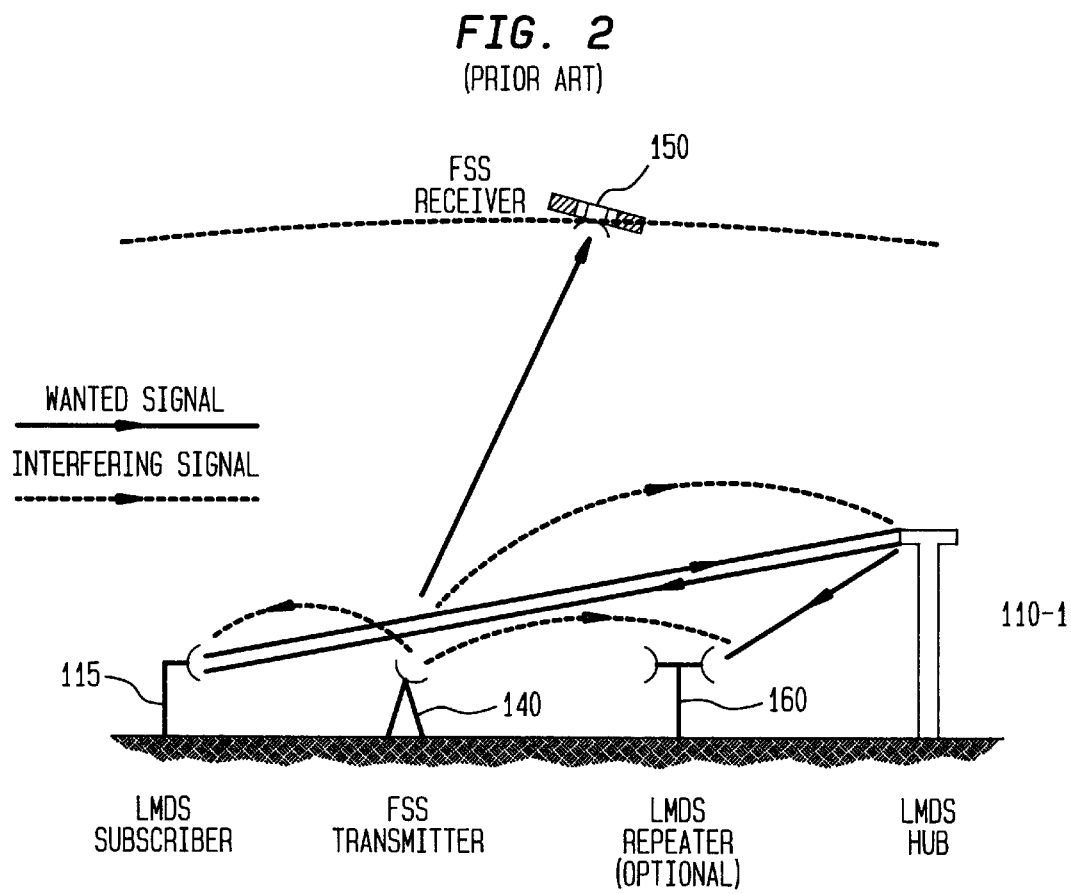
FIG. 2 illustrates an exemplary interference scenario in which an uplink transmitter of a fixed satellite service (FSS) system interferes with reception of a downlink signal transmitted from an LMDS hub to an LMDS subscriber.
Figures 3, 4:
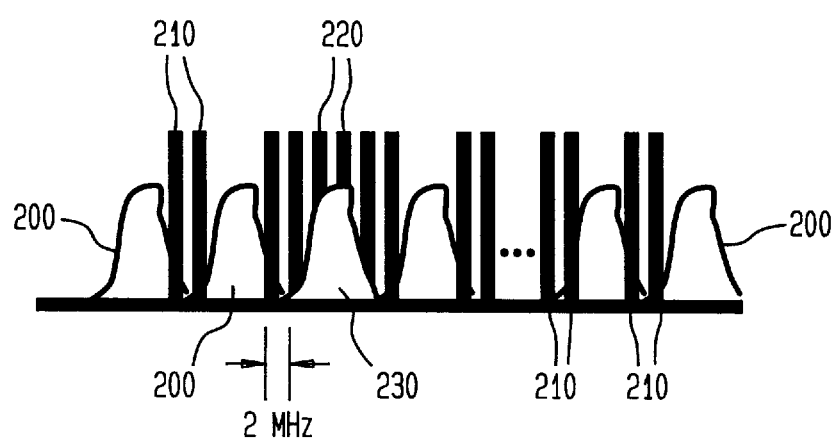
FIG. 3 is a diagram of an exemplary channel frequency interleaving suitable for use in an LMDS hub.
FIG. 4 illustrates a frequency spectrum resulting from application of interference reduction in accordance with the invention to exemplary LMDS and FSS systems.

FIG. 3 shows an exemplary portion of a shared frequency spectrum allocated in accordance with the present invention. The portion of the above-noted 28 GHz frequency band proposed for sharing between FSS and LMDS service providers is typically at least 400 MHz wide. The example of FIG. 3 shows part of a shared 400 MHz portion of the frequency band in an exemplary broadcast FM video LMDS system. The LMDS downlink spectrum in the shared 400 MHz portion is channelized into 20 MHz channels with an occupied bandwidth of 18 MHz per channel. Each of a series of relatively broadband signal spectra 200 represent individual downlink FM video signals transmitted from an LMDS hub 110-i to subscribers 115 within the corresponding cell 105-i. The spectra 200 utilize the 18 MHz of occupied bandwidth within each 20 MHz LMDS channel. The LMDS downlink spectrum therefore includes frequency gaps of about 2 MHz between signal spectra 200 in adjacent channels. These frequency gaps are also commonly referred to as guard bands.

If possible, FSS uplink transmissions are directed into the LMDS downlink frequency gaps such that the number of co-frequency interference exposures to LMDS subscriber receivers is reduced. This is illustrated in FIG. 3 in the form of several narrowband FSS uplink spectra 210 arranged within the 2 MHz frequency gaps between adjacent LMDS downlink spectra 200. The uplink spectra represent uplink transmissions from FSS transmitter 140 to a space-based FSS receiver 150. It should be noted that the uplink spectra will not be directed to the gaps in this manner if the uplink spectra will not fit within the gaps. In the example of FIG. 3, the FSS uplink signals have a bandwidth of less than about 1 MHz such that at least two different uplink transmissions may be accommodated between each pair of LMDS spectra 200. The spectra 200 may be from several different FSS uplink transmitters, or may represent different uplink transmission channels from a single multi-channel uplink transmitter. The placement of the spectra 210 within the shared LMDS/FSS spectrum is determined in accordance with a technique to be described in detail below.

An ordered list of frequencies may also be utilized in each LMDS cell as determined by the LMDS provider for sequential use by FSS uplinks located in that cell. This is illustrated in FIG. 3 by narrowband FSS uplink spectra 220 transmitted in the same portion of the shared spectrum as a broadband LMDS downlink signal spectrum 230. The LMDS signal spectrum 230 thus represents a single LMDS channel signal which has been selected by the LMDS service provider as a first channel which may be potentially interfered with by an FSS uplink transmission. The FSS transmitter determines which LMDS channel to transmit in by first checking to make sure that the FSS uplink signal spectrum will not fit in an LMDS frequency gap or that all available transmission frequencies within frequency gaps are already being utilized by other FSS uplink transmissions. The FSS transmitter then selects a transmission frequency from an ordered list for that cell as designated by the LMDS service provider. In this example, the LMDS service provider has designated two possible FSS uplink transmission frequencies within the channel occupied by LMDS spectrum 230 as the first two entries in the ordered frequency list for the given cell. The FSS uplinks are therefore free to transmit uplink spectra 220 despite the fact that those spectra may create undesirable interference with the LMDS downlink signal spectrum 230. The LMDS service provider selects the channel or channels in which it permits interference in accordance with a reduced availability channel plan as will be described below.

The present invention thus involves directing potential interference within a given LMDS cell to a specific channel or channels in the LMDS downlink spectrum. The availability of a specific potentially-interfered LMDS channel may then be lower than the availability of the remaining non-interfered LMDS channels, and the LMDS service provider can decide whether or not to offer program material in the potentially-interfered channel. It should be noted that both FSS and LMDS systems retain simultaneous access to the entire frequency band in all geographic areas. This provides advantages over prior art band segmentation techniques which would deny access to portions of the frequency band to both LMDS and FSS systems.

FIG. 4 illustrates an exemplary reduced availability plan for an LMDS system in accordance with the present invention. The LMDS system includes at least 42 different channel frequency sets designated 1A, 2A . . . 20A and 1B . . . 22B. The designations A and B refer to the location of the guard band in that cell for a system employing frequency interleaving. The plan may be utilized in a multi-cell LMDS coverage area 240 that coincides with a portion of a particular FSS coverage area. The LMDS coverage area 240 is represented in this example as a square area comprising sixty-four separate LMDS cells 245. Channel sets A and B are frequency interleaved between adjacent rows of cells as shown. The channel designation in a given cell 245 represents the set of channel frequencies that an FSS uplink transmitter located in that cell would use first after exhausting the 2 MHz frequency gaps previously mentioned. FSS uplinks within the multi-cell area 240 are thus not prohibited from transmitting on a given channel frequency, but are instead directed to utilize certain frequencies before other frequencies, depending on the cell 245 in which a given uplink is located. The frequency interleaving in this example specifies that the frequency gaps for channel sets A and B are interleaved such that two sets of 2 MHz gaps are available for each channel throughout the multi-cell area 240. It should be noted that the locations of the gaps could also be stored as a list similar to the above-described ordered frequency list.

As noted above, if there are no frequency gaps available for uplink transmission, an FSS uplink located in a given LMDS cell searches an ordered list of possible uplink transmission frequencies designated by the LMDS provider for use by FSS uplinks operating in the given cell. The uplink continues to search the ordered frequency list until a transmission frequency is found that is not currently in use by other FSS uplinks accessing the FSS satellite receiver. The frequency gaps and the ordered frequency list together cover the entire shared frequency band so that there is no capacity penalty for the FSS system. Frequencies on the ordered list thus coincide with operational LMDS hub-to-subscriber downlink transmission channels. The single LMDS channel designation shown in a given cell 245 would thus be the first LMDS channel in that cell to encounter harmful interference from an FSS uplink transmitting in the given cell, such that the downlink signal quality of this channel would be lower than that of the other LMDS channels in the given cell. By sacrificing some availability in a single predetermined channel, the present invention substantially reduces the potential for interference with the remaining channels. In other embodiments, the ordered list may include frequencies corresponding to more than one LMDS channel.

Figure 5:
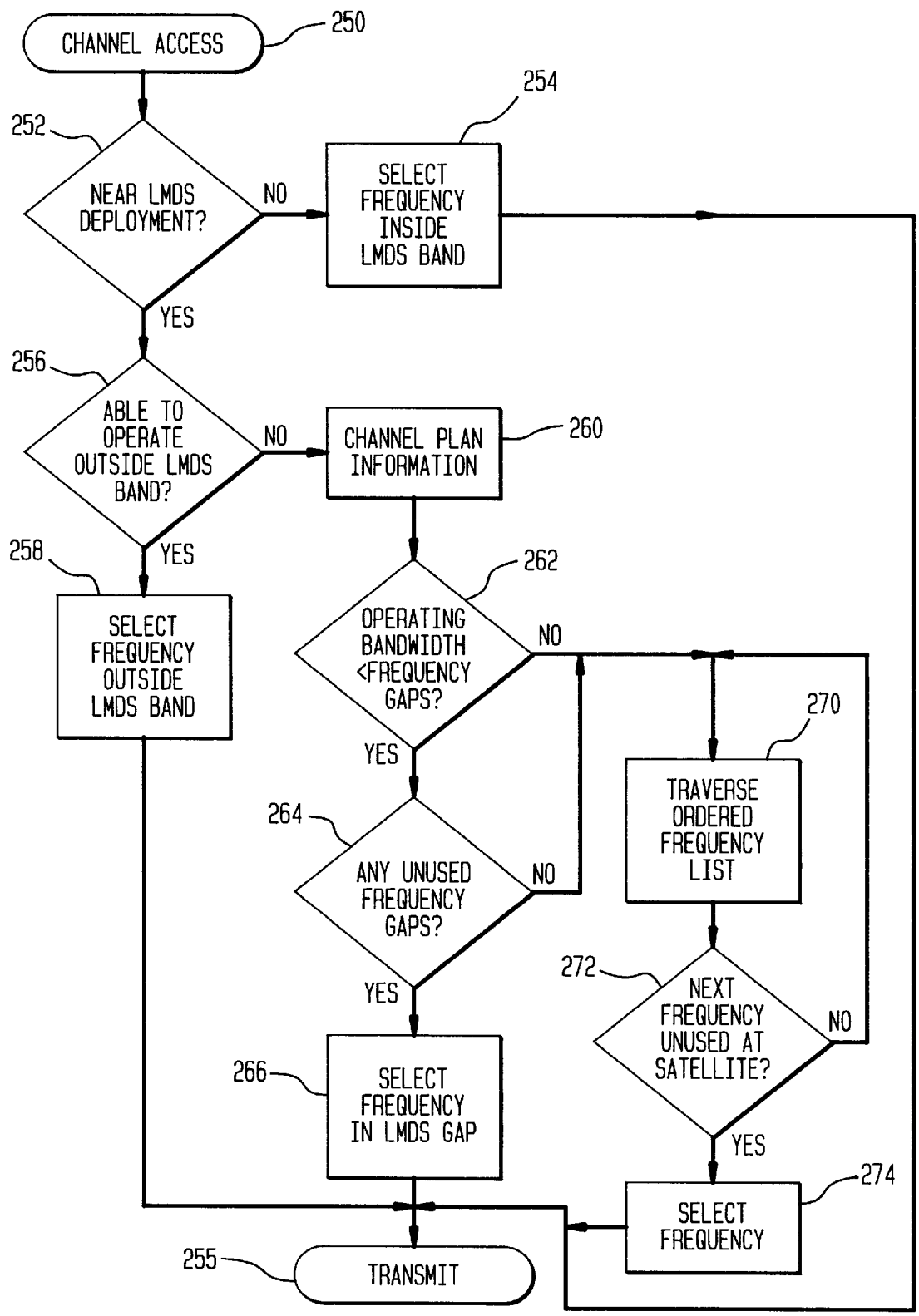
FIG. 5 is a flow chart of an exemplary interference reduction process in accordance with the present invention.

FIG. 5 is a flow chart illustrating exemplary process steps carried out in an FSS uplink to select a suitable transmission frequency. In step 250, a channel access request is initiated by an FSS subscriber indicating a desire to send an uplink transmission. A determination is made in step 252 as to whether the accessed FSS uplink transmitter is near an LMDS deployment, that is, whether the uplink transmitter could potentially interfere with LMDS downlink transmissions. This is generally determined by the LMDS service provider when assigning the preferred frequencies for the cells in the LMDS system. For example, the accessed uplink transmitter may be either inside or outside the signal receiving range of an LMDS cell. If the FSS transmitter is located such that there is no potential for interference with an LMDS system, step 254 indicates that any transmission frequency within the LMDS band may be selected. An FSS uplink signal is then transmitted as shown in step 255. If the FSS uplink transmitter is near an LMDS deployment such that the potential for interference exists, step 256 determines whether the FSS uplink is able to operate outside the LMDS band. If the uplink can operate outside the LMDS band, step 258 indicates that an uplink transmission frequency outside the LMDS band is selected. The uplink signal is then transmitted at the selected frequency in step 255. If the FSS uplink is not able to operate outside the LMDS band, step 260 indicates that the uplink then retrieves previously-stored channel plan information obtained from, for example, the LMDS service provider. This stored information includes an indication of any frequency gaps in the LMDS downlink signal spectrum which are suitable for uplink transmissions, as well as an ordered list of frequencies designated as suitable for uplink transmission by the LMDS service provider.

A determination is then made in step 262 as to whether the operating bandwidth of the uplink is less than the LMDS frequency gap such that an uplink signal could be transmitted in the gap. This is generally dependent upon the specific technical characteristics of the FSS system. If the uplink bandwidth will fit within the frequency gap, the process determines whether there are unused frequency gaps available for uplink transmission as shown in step 264. If there are unused frequency gaps available, step 266 indicates that a frequency within one of the gaps is selected, and an uplink signal is then transmitted at that frequency in step 255. If the bandwidth of the uplink signal to be transmitted is greater than the frequency gaps or if there are no unused frequency gaps available, the process moves to step 270 in which the ordered frequency list retrieved in step 260 is traversed sequentially. Step 272 determines whether the next frequency on the ordered list is unused at the FSS satellite receiver. If the next frequency on the ordered list is unused, that frequency is selected as shown in step 274, and an uplink signal is transmitted at the selected frequency in step 255. If the next frequency on the ordered list is in use at the receiver, step 272 indicates that the list traversal step 270 is repeated until an unused frequency suitable for uplink signal transmission is located.

Figure 6:
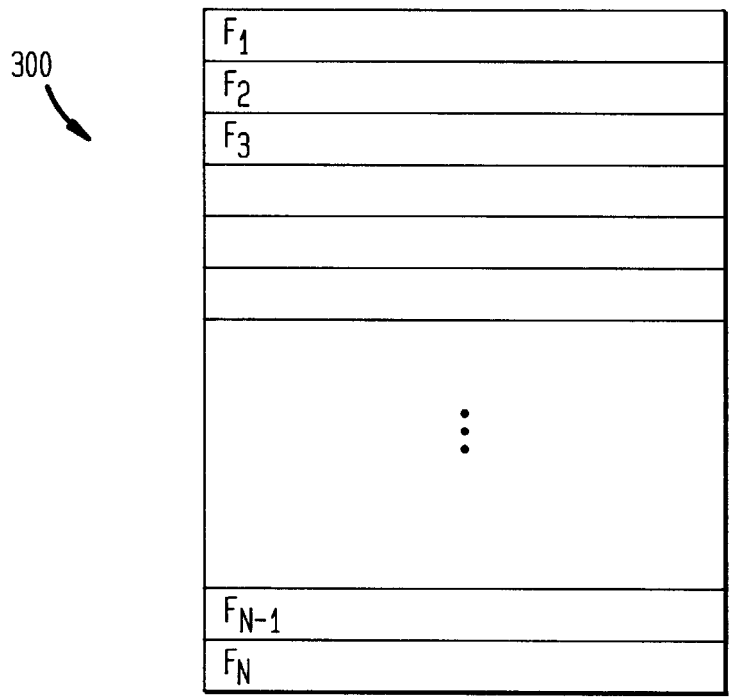
FIG. 6 illustrates an ordered frequency list in accordance with the invention.

FIG. 6 shows an exemplary ordered frequency list 300 suitable for use in the process of FIG. 5. The list 300 includes a number of entries $F_1, F_2, \ldots F_{N-1}, F_N$ which indicate possible uplink transmission frequencies for FSS uplinks located within a given cell. Each LMDS cell will generally have a different ordered list, as was described above in conjunction with FIG. 4. The order of frequencies on the list will generally be determined by the LMDS system provider in order to minimize the impact of potential FSS uplink interference on the LMDS operations. The list may be stored in a system memory within each FSS uplink earth station or within a satellite system memory location accessible by a number of different uplink earth stations. Determination as to whether the ordered frequencies for a given LMDS cell correspond to downstream or return link traffic may be left to the discretion of the particular LMDS service provider.

Figure 7:
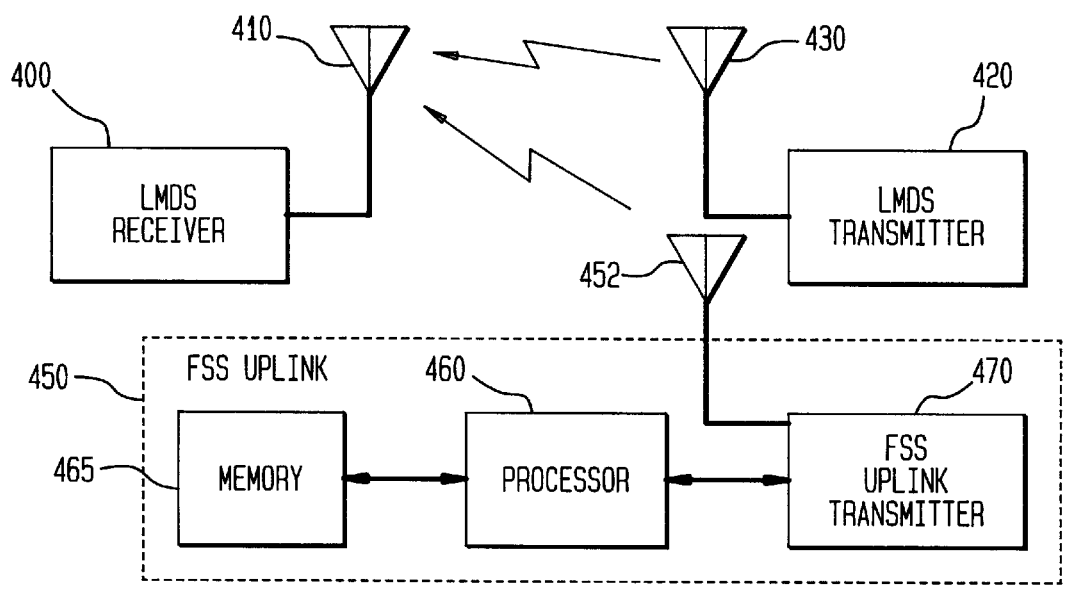
FIG. 7 is a block diagram of an exemplary implementation of the present invention in an FSS system which shares a frequency band with an LMDS system.

FIG. 7 is a block diagram of an exemplary implementation of the present invention. An LMDS receiver 400 includes an antenna 410 suitable for receiving signals transmitted from an LMDS transmitter 420 via an antenna 430. The LMDS receiver 400 may be a subscriber or hub receiver, and the LMDS transmitter may be a subscriber or hub transmitter. An FSS uplink 450 transmits uplink signals via an antenna 452 at frequencies selected using the process of FIG. 5. The uplink signals are received as interfering signals in LMDS antenna 410. The uplink 450 further includes a processor 460 which is coupled to a memory 465 and programmed to implement the process steps described in conjunction with FIG. 5. The processor 460 may be a computer, microprocessor, application-specific integrated circuit (ASIC) or other suitable digital data processor. The memory 465 may be a magnetic disk or tape device, an optical disk device, a electronic programmable readonly memory (ROM), an electronic static or dynamic random access memory, or any other memory device suitable for storing the above-described channel plan information. An uplink transmitter 470 receives an indication from processor 460 as to a suitable transmission frequency, and transmits an uplink signal at that frequency via antenna 452. Of course, numerous alternative hardware implementations of the present invention will be readily apparent to those skilled in the art.

Implementation of the FSS/LMDS spectrum protocol will generally involve communication between LMDS service providers and FSS service providers. Minor system design modifications may be required to implement the protocol. In the exemplary embodiment described in conjunction with FIG. 5 above, each FSS uplink maintains an ordered list of the frequencies to be used for uplink transmission, obtained from the LMDS service provider. As noted above, the ordered list and other channel plan information may be stored at each FSS uplink earth station or in a satellite system database. The appropriate location depends upon the channel access procedure specified in the satellite system design. If located in the earth station, the list could readily be loaded into memory once the fixed operational location of the uplink was known. For transportable FSS uplinks, the operational location could be continuously updated using, for example, signals from the Global Positioning Satellite (GPS) system. For an FSS satellite-controlled access procedure, once the earth station identifier of the uplink requesting service is known, the FSS satellite can perform a database lookup to determine the appropriate frequency list to be used in finding the most appropriate operating frequency. This may be carried out in a manner similar to that used to verify that a user requesting access is a customer in good standing for customer billing purposes. For simplicity, there may be a limited number of possible channel ordering plans that would reduce the amount of additional traffic load caused by database access. Alternatively, channel list information could be updated periodically in the FSS earth station memory using information from downlink satellite transmissions. This method would also allow for changes in the LMDS channel plan information to be conveyed to the FSS earth stations over the FSS system itself.

The appropriate channel plan for an individual FSS uplink earth station may be determined by the potentially affected LMDS service provider in the geographic area where the uplink is located. One possible method for exchanging this information would be for the FSS service provider to supply the latitude and longitude of each uplink earth station to the LMDS service provider or an industry-wide LMDS database maintenance organization. The potentially affected LMDS service provider will then supply the appropriate ordered frequency list for that uplink earth station. Once this information is entered into an FSS system memory, either in an uplink earth station or a centralized database, the uplink will be authorized to transmit in accordance with the protocol. Verification of compliance with the protocol can easily be accomplished with the appropriate system diagnostic tools.

The process steps of FIG. 5 provide a spectrum protocol which accommodates both LMDS and FSS systems in a common frequency band while reducing and controlling inter-system interference. The full allocated bandwidth of the FSS system is available for FSS uplink transmissions, even if all uplink transmissions are in the same LMDS cell. There is no FSS capacity penalty for implementing the spectrum protocol because FSS uplinks are not prohibited from transmitting on any given frequency. The LMDS system also uses the entire frequency band in each cell, with reduced availability in only one or more predetermined channels. Compliance with the spectrum protocol makes the FSS uplink a "good neighbor" by directing the potential interference to specified portions of the LMDS frequency band, thereby reducing the likelihood of co-frequency operation with nearby LMDS receivers. Compliance permits LMDS service providers to effectively design their systems and tailor their service offerings to deal with the occasional received interference.

A number of exemplary applications of the present invention will now be described with reference to specific types of FSS uplinks. Each of the specific FSS uplinks referred to below is described in greater detail in the above-cited LMDS/FSS 28 GHz Band NRMC Final Report. One proposed FSS uplink is a Teledesic Standard Terminal (TST), which generally requires a contiguous allocated bandwidth of 275 kHz for each 16 kbps system user. At least seven uplink frequency slots are therefore available in each 2 MHz frequency gap between adjacent LMDS channels. There are 19 such frequency gaps in each frequency interleaved channel set. Selecting one LMDS video channel as the first one to receive harmful interference provides an additional 16 MHz in each LMDS cell. Although each LMDS video channel occupies 18 MHz, the 2 MHz at the center of the channel has already been prioritized for use in cells with the alternate frequency interleaving scheme. This gives an additional 57 frequency slots for a 16 kbps uplink to use before causing harmful interference in that cell to LMDS channels other than the single reduced availability channel.

Another exemplary FSS uplink is a T1 rate TST uplink which generally occupies a contiguous bandwidth of 26.4 MHz. The contiguous T1 rate TST bandwidth roughly corresponds to a single LMDS video channel. While there will be some additional degradation of adjacent LMDS video channels, the extent of this degradation will be limited since the adjacent channels are only partially overlapping with the T1 rate TST uplink. With the spectrum protocol of the present invention, essentially the first active T1 rate TST uplink in each LMDS cell does not cause harmful interference outside the single reduced availability LMDS channel. Harmful interference will generally occur only when multiple uplinks in the same LMDS cell are simultaneously active. The improvement in LMDS availability therefore decreases when simultaneously active FSS uplinks are clustered in a small geographic region.

Another exemplary FSS uplink is known as SPACEWAY, and was developed by Hughes Aircraft Company. Multiple SPACEWAY uplinks operating at a ½ or ¼ T1 rate can generally fit in the 2 MHz frequency gaps between LMDS channels of the CellularVision system previously described. In a single 18 MHz segment of spectrum, 9 T1 rate SPACEWAY uplinks could be accommodated in each LMDS cell without causing harmful interference. Consider an exemplary partially overlapping frequency allocation between the SPACEWAY system and the LMDS system in which the SPACEWAY system is allocated a 29.0–30.0 GHz band and the LMDS system is allocated a 28.5–29.5 GHz band. SPACEWAY uplinks operating in areas where LMDS receivers are present should therefore first operate in the 29.5–30.0 GHz band whenever possible, as indicated in steps 256 and 258 of the FIG. 5 process. When the entire 29.5–30.0 GHz band is in use by other FSS uplinks, the FSS uplinks should operate in one of the 24 available 2 MHz frequency gaps in the 29.0–29.5 GHz LMDS broadcast spectrum. When frequency interleaving is used, there are two groups of 24 frequency gaps that are available in any area where LMDS downlinks and SPACEWAY uplinks coexist. SPACEWAY uplinks that operate in regions where there are no LMDS receivers should transmit in the 29.0–29.5 GHz portion of the frequency band so that they do not use up the available FSS system capacity for uplinks operating in areas where LMDS is deployed. With SPACEWAY uplinks located in the same geographic areas as LMDS systems and operating in the 29.5–30.0 GHz band before operating in the shared 29.0–29.5 GHz band, the likelihood of interference from these uplinks is substantially reduced.

The present invention may also be utilized with LMDS systems other than the exemplary CellularVision system previously described. As noted above, an exemplary digital LMDS system described by Texas Instruments to the NRMC included 52 MHz channel bandwidths with a flexible service offering of video, data, and telephony. The allocated spectrum is divided into uplink and downlink segments. Traffic usage is not only for broadcast services, but also includes two-way multiple access communications as LMDS subscribers initiate and terminate communications with a cell hub. All LMDS channels are thus not used all the time since the system would be designed for peak capacity during the busy hour with some specified probability of blocking. FSS uplinks could transmit on an ordered list of frequencies that is specific to the LMDS cell where the FSS uplink is located. Selection of which portion of the LMDS spectrum to interfere with first would generally be different in each LMDS cell such that multiple FSS uplinks could transmit in a given cell before causing harmful interference in channels other than the one or more specified reduced availability channels for that cell.

Implementation of the spectrum protocol of the present invention may or may not affect LMDS subscriber-to-hub return links depending upon the LMDS frequency plan. The LMDS service provider has the option to tailor the implementation of the protocol to most efficiently meet the system performance objectives. For implementations of the FSS/LMDS spectrum protocol that specify LMDS return link frequencies at the beginning of the ordered frequency list, the availability of LMDS return link channels becomes an issue. For many LMDS systems, the return link is a multiple access channel. Interference from FSS uplink transmissions reduces the capacity of the LMDS return links. Return link capacity can thus be traded for downlink LMDS availability. Some portion of the allocated LMDS bandwidth outside the portion shared with FSS could be reserved for return link traffic, to ensure some minimum amount of return link capacity. With the potential for interference on these return links in shared spectrum systems, methods of frequency assignment similar to automatic link transfer (ALT) or handoff used in cellular and PCS radio systems could be implemented to prevent dropped "calls" due to the presence of interference on a given channel. A possible alternative involves the use of interference cancellers at hub receivers, but would generally increase the system complexity.

Each LMDS hub receiver generally has an interference susceptibility zone around it determined from the calculation for the minimum required separation distance between it and the FSS uplink transmitters. If an FSS uplink is located in this interference zone, it could cause interference to the LMDS hub receiver. One possible method of protecting the hub receiver would be to implement the above-described ordered frequency list such that FSS uplinks close to the LMDS hub operate on a frequency corresponding to one of the LMDS downlink channels. The selected downlink channel may be a single reduced availability channel or another LMDS channel. By tailoring the implementation of the spectrum protocol for uplinks that are located near LMDS hubs, the LMDS service provider can balance the LMDS downlink and return link availability. This generally does not increase the complexity of the protocol, but instead only affects the order of the frequency list.

The size of the interference susceptibility zone around a given LMDS hub receiver can of course be reduced by modifying the LMDS return link system design. Possible modifications include the use of a higher transmitter power at the LMDS subscriber unit, and the use of multiple directional hub receiver antennas. Although use of a directional hub antenna would increase the return link availability for some users, it would generally not improve the performance in locations where both the LMDS subscriber and the co-frequency active FSS uplink are located in the main beam of the hub receiver antenna unless the increased link margin provided by the directional antenna increased the carrier power enough to overcome the effect of the interference. Use of multiple sector hub receiver antennas would also increase the return link capacity, allowing operation on a frequency different than that of the interfering FSS uplink.

Numerous alternative embodiments within the scope of the appended claims will be apparent to those of ordinary skill in the art.

We claim:

1. A method of reducing interference between an uplink transmitter of a first wireless communication system and a receiver of a second wireless communication system wherein the second communication system includes a plurality of cells, comprising the steps of:

assigning at least one preferred uplink transmission frequency to each of a plurality of uplink transmitters of the first communication system located in cells of the second communication system, such that at least one of the uplink transmitters located in one of the cells is assigned a different preferred frequency than another of the uplink tranmsitters located in another of the cells, said step of assigning including determining the cell or cells of the second communication system in which each of the plurality of uplink transmitters is located, assigning a common ordered frequency list to uplink transmitters located in the same cell, and storing the common ordered list of preferred frequencies for the same cell in one or more memory locations accessible by up-link transmitters located in that cell; and selecting uplink transmission frequencies in the first communication system in accordance with the assigned preferred frequencies.

2. A method of reducing interference between an uplink transmitter of a first wireless communication system and a receiver of a second wireless communication system, wherein the second communication system includes a plurality of cells, comprising the steps of:

assigning at least one preferred uplink transmission frequency to each of a plurality of uplink transmitters of the first communication system, located in cells of the second communication system, such that at least one of the uplink transmitters located in one of the cells is assigned a different preferred frequency than another of the up-link transmitters located in another of the cells; and selecting uplink transmission frequencies in the first communication system in accordance with the assigned preferred frecuencies, wherein the step of selecting uplink transmission frequencies further includes the steps of:

determining if a given uplink transmitter will potentially interfere with the receiver of the second communication system; and selecting an uplink transmission frequency inside a bandwidth of the receiver if the given uplink transmitter will not potentially interfere with the receiver.

3. A method of reducing interference between an uplink transmitter of a first wireless communication system and a receiver of a second wireless communication system, wherein the second communication system includes a plurality of cells, comprising the steps of:

assigning at least one preferred uplink transmission frequency to each of a plurality of uplink transmitters of the first communication system located in cells of the second communication system, such that at least one of the uplink transmitters located in one of the cells is assigned a different preferred frequency than another of the uplink transmitters located in another of the cells; and selecting uplink transmission frequencies in the first communication system in accordance with the assigned preferred frequencies. said selecting step including determining if a given uplink transmitter is able to operate outside a frequency band of the second communication system; and selecting an uplink transmission frequency outside the frequency band of the second system if the given uplink transmitter is able to operate outside the frequency band.

4. A method of reducing interference between an uplink transmitter of a first wireless communication system and a receiver of a second wireless communication system, wherein the second communication system includes a plurality of cells. Comprising the steps of:

assigning at least one preferred uplink transmission frequency to each of a plurality of uplink transmitters of the first communication system located in cells of the second communication system, such that at least one of the uplink transmitters located in one of the cells is assigned a different preferred frequency than another of the uplink transmitters located in another of the cells, and selecting uplink transmission frequencies in the first communication system in accordance with the assigned frequencies, the step of selecting uplink transmission frequencies further including the steps of:

retrieving channel plan information including an indication of any usable frequency gaps in the frequency band of the second system and an ordered frequency list, wherein the ordered frequency list includes the preferred frequency for a given uplink transmitter;

selecting an uplink transmission frequency in one of the frequency gaps of the frequency band of the second system if available; and selecting an uplink transmission frequency from the ordered list if the frequency gaps are unavailable.

5. An apparatus for reducing interference between an uplink transmitter of a first wireless communication system and a receiver of a second wireless communication system, the second communication system including a plurality of cells, the apparatus comprising:

a processor coupled to the uplink transmitter in the first communication system and operative to select an uplink transmission frequency for the transmitter from at least a preferred transmission frequency assigned to that transmitter, wherein the preferred transmission frequency for the transmitter is assigned based on the cell of the second communication system in which the transmitter is located;

a memory coupled to the processor and operative to store the preferred uplink transmission frequency; and wherein the processor is operative to retrieve channel plan information including an indication of frequency gaps in a frequency band of the second system and an ordered frequency list, the ordered frequency list including the preferred frequency for a given uplink transmitter.

6. The apparatus of claim 5 wherein the processor is operative to select an uplink transmission frequency for the given uplink transmitter in one of the frequency gaps of the second system if available.

7. The apparatus of claim 5 wherein the processor is operative to select an uplink transmission frequency for the given uplink transmitter from the ordered list if the frequency gaps are unavailable.

* * * * *